United States Patent [19]

Andujar

[11] Patent Number: 5,604,022
[45] Date of Patent: Feb. 18, 1997

[54] ANTITRAUMA PACKET

[75] Inventor: Fernando H. Andujar, Buenos Aires, Argentina

[73] Assignee: Niltar Trading S.A., Montevideo, Uruguay

[21] Appl. No.: 396,213

[22] Filed: Feb. 28, 1995

[30] Foreign Application Priority Data

Feb. 28, 1994 [AR] Argentina ................................... 327533

[51] Int. Cl.⁶ .............................. B32B 9/00; B32B 27/00
[52] U.S. Cl. ......................... 442/338; 428/406; 428/408; 428/423.5; 428/902; 428/911; 428/76; 442/339
[58] Field of Search ..................................... 428/229, 235, 428/237, 240, 406, 408, 423.5, 902, 911

[56] References Cited

U.S. PATENT DOCUMENTS 4,543,106  9/1985  Parekh .

*Primary Examiner*—Patrick Ryan
*Assistant Examiner*—Rich Weisberger
*Attorney, Agent, or Firm*—Darby & Darby

[57] ABSTRACT

An antitrauma packet for supplementing that resistance to mechanical impact and to ballistic penetration of structures that are made of at least one panel of polymeric fibers. At least one layer, having a plurality of polymeric fibers with a plurality of hollow microspheres scattered therein, is attached to the at least one panel.

10 Claims, 1 Drawing Sheet

ANTITRAUMA PACKET

BACKGROUND OF THE INVENTION

1. Field of the Invention

The present invention relates to a material or structure that resists ballistic penetration and mechanical impact forces. More specifically, the present invention relates to a material that is comprised of a matrix of polymeric fibers in which a plurality of microspheres are spread throughout.

2. Description of the Related Art

The invention of linear polyamides (e.g., nylon, nylon 6, etc.), has lead to further research for new synthetic textile fibers, polyester fibers, polyurethane fibers, etc. This research led to the invention of a type of fibers which have high heat resistance and high resistance to mechanical strain. These new fibers are classified under the generic name of "para amide fibers" (or simply aramid fibers), and include KEVLAR®, NOMEX® and TWARON®, three important members of this group.

Aramid polymers are a product of the reaction of the amino groups of a p-diaminobenzene compound and the acid groups of a terephthalic acid compound. (The first example of a para amide polymer in this series was obtained from the polymerization of p-aminobenzoic acid, coded PPD-T.)

In view of its superior mechanical and dynamic properties, its reduced expansion and thermal conductivity, its excellent abrasion resistance, heat resistance and chemical inertia, the aramid fibers and in particular, KEVLAR® and TWARON® have been used in a great number of applications in the manufacture of ropes, laminated tissues, etc. Aramid fibers are also used in the field of ballistic protection, both as soft body armors and heavy, high coverage armors, instead of body armors and bullet-resistant vests that are made of, for example, polyester fibers or nylon fibers.

The application of polymeric fiber materials in ballistic protection replaced other integrated structures with denser materials such as glass fibers or aluminum fibers. The ballistic resistance of polymeric fibers is greater than that of glass or aluminum fibers. It is believed that the ballistic resistance of fibers in general is due to the fact that, as a consequence of the impact and the penetration of the bullets, the yarns are stretched and thus absorb the energy of the projectile and dissipate that energy laterally (through the fibrous yarns which surround the impact zone) and also dissipate that energy longitudinally in the direction of the projectile. Aramids, the same as their predecessors, aliphatic polyamides and polyesters, are used under the form of flexible structures (of woven fibers arranged in juxtaposed layers or of masses of felt-like (i.e., unwoven) fibers having the thickness determined by the degree of exposure to projectiles) or rigid structures of laminate aramids for fragment and bullet-resistant garments and body armor panels. These structures and pieces are applicable for both soft armors and heavy armors.

Materials used in ballistic protection should meet the regulations of standard norms, which vary in each country. The standard norms establish the conditions to measure the speed of projectiles, and to measure penetration of the projectile into the material to determine the limit of the material. Ballistic resistance, for example, is the maximum velocity at which a fired bullet may be stopped and the bullet resistance corresponds to a "$V_{50}$" value, which is defined as the velocity at which the penetration probability is 50%.

Another factor contemplated by the norms refers to the body protection and is important for the design and manufacture of personal body armors and garments. The body protection is the magnitude and the profile of the deformation in the armor backing material or support of a bullet defense. This deformation, which for a certain defense, depends on the caliber, the weight, the velocity and the kind of bullet or fragment, may cause damage or bodily injuries, the severity of which also depends on the point of impact, since part of the energy of each impact is felt and received in the area of the body which is in line with the point of impact and results in traumas of a particularly severe nature when they correspond to the hepatic region, the left iliac cavity, the spine, etc. The maximum deformation of the rear part of a ballistic defense after the impact is called "trauma", and is quantitatively expressed by its depth (the length of the deformation in the direction of the impact).

In practice, the ballistic protection (soft or rigid) is obtained by panels (also called packets) that are formed by a layer or a plurality of layers of fabrics made of woven or felt-like (i.e., unwoven) aramid fibers, such as KEVLAR 29®, KEVLAR 49®, TWARON CT 930®, TWARON 1260®, etc. Each panel is covered by a hermetic, waterproof, flexible cover or envelope having a predetermined thickness and design depending on the level of protection desired and the bullet parameters. Depending on each case, the flexible cover may be backstitched in order to increase the density of the fiber mass.

In laminated materials, the woven or unwoven aramid fibers are combined with polyester resins, phenolic resins, elastomers, and depending on each case, with carbon fibers or ceramic fibers to form a structure to be applied in heavy ballistic armors (e.g., helmets, defensive armors for vehicles, shelters or cabins, etc.)

Trauma may be controlled by modifying the thickness of the ballistic panels, the density of the fiber mass, the weave pattern of the fibers, etc. Additionally, trauma may be controlled by incorporating additional laminates of antitrauma packets, aramid fillings or ceramic plates which cover the whole or a part of the front or the back of the ballistic panels.

SUMMARY OF THE INVENTION

It is an object of the present invention to increase the ballistic resistance, the bullet penetration, and reduce the magnitude of the trauma of structures that are resistant to impact and/or to ballistic penetration.

It is a further object of this invention to provide an antitrauma packet to supplement the resistance of the mechanical impact and/or the ballistic penetration of structures formed by panels of woven, unwoven or laminated polymeric fibers. The packet comprises at least one layer or sheet which defines a matrix of woven or unwoven polymeric fibers including a plurality of hollow microspheres.

It is another object of this invention to provide an antitrauma packet to supplement the resistance to the mechanical impact and/or the ballistic penetration of structures formed by panels of woven or unwoven aramid fibers. The packet comprising at least one layer or sheet which includes a matrix of woven or unwoven aramid fibers having a plurality of hollow microspheres which together define a polymeric covering.

It is yet another object of this invention to provide a garment for body ballistic protection of the type which comprises a bullet-resistant panel formed by at least one plate or sheet of woven or unwoven aramid fibers. The panel acts as filling within a cover that is defined by a closed and waterproof covering and at least an additional panel formed by a plurality of sheets formed by a matrix of polymeric fibers, such as aramid fibers where a plurality of hollow microspheres are scattered therein.

It is yet another object of the present invention to provide an armor which comprises a reinforced structure resistant to the mechanical impact which comprises a plurality of layers of aramid fibers consolidated with synthetic resins, such as polyester resins or phenolic resins and as an additional antitrauma structure. At least one packet is defined by a closed and waterproof envelope having at least one of the layers or sheets of woven or unwoven fibers, for example, aramid fibers, where hollow microspheres are scattered therein.

BRIEF DESCRIPTION OF THE FIGURES

The above and still further objects, features and advantages of the present invention will become apparent upon consideration of the following detailed description of a specific embodiment thereof, especially when taken in conjunction with the accompanying drawings wherein like reference numerals in the various figures are utilized to designate like components, and wherein.

DETAILED DESCRIPTION OF THE PRESENTLY PREFERRED EMBODIMENTS

Figure 1:
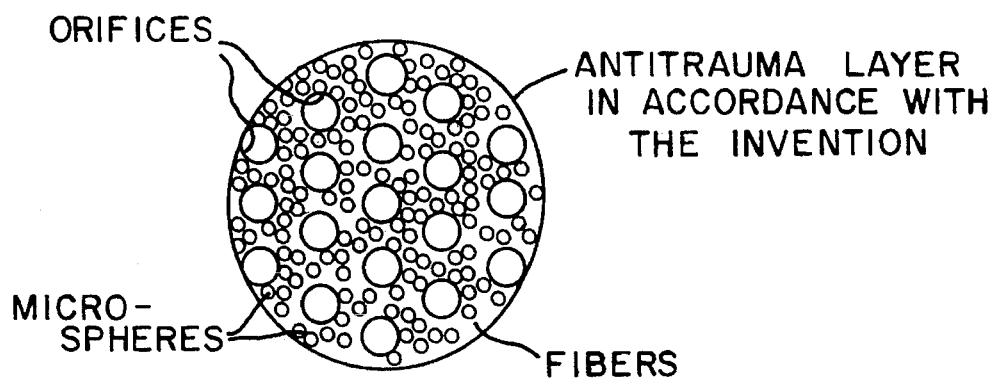
FIG. 1 shows an enlarged view of an antitrauma layer according to the present invention.

The antitrauma packet of the present invention comprises a plurality of juxtaposed laminates or layers or a substrate or matrix of woven or unwoven fibers, as a support for a plurality of hollow microspheres that are randomly scattered in the matrix.

These kinds of support materials per sé, are well known in the art. These support materials have been used in the manufacture of laminates or as low weight reinforcing material, to replace other known reinforcing materials, such as liners or blankets made of reticulate woven polyester fibers, glass fibers or aramid fibers, etc., all of which have a heavier weight.

The present invention preferably uses the commercially available product known as COREMAT®. However, it should be understood that the present invention should not be limited to this product and the fiber/microsphere component can comprise virtually any fiber product so long as hollow microspheres are used as an additional component for the antitrauma structures or materials.

COREMAT® (a product of Lantor B.V.) is in the form of blankets or laminates of unwoven polyester fibers and has a variable thickness and density. In the tests conducted and explained hereinbelow, blankets having a thickness of 2 mm were used. These blankets were 60% by weight of polyester fibers and 40% by weight of hollow polymeric microspheres. The blankets had a density of approximately 40/g/m²/mm of thickness. The large number of microspheres used in forming the blankets plays a fundamental role in obtaining such reduced density levels.

The packet of the present invention should be united with a number of laminates in accordance with the level of supplemental protection required, which, of course depends on the type of impact load that the material is to withstand. For example, the impact load may be from the velocity of a bullet when it refers to ballistic defenses, or to the strength or the condition of a certain mechanical impact when it refers to defenses against purely mechanical aggressions or effects (bumper or fender structures) in the protection, for example, of critical parts or areas of civil or military vehicles.

The antitrauma packet of this invention has increased resistance to ballistic penetration and to mechanical impact. The material, which carries the microspheres, in accordance with this invention, is a reinforcement of laminate materials, having a function similar to that of other reinforcement materials, but which is extremely lightweight.

In this invention, the fiber structure and the microspheres make up a material having unexpected superior antitrauma effects, as shown in the tests explained hereinbelow.

The packet of this invention can be of the form of units or panels with a determined number of juxtaposed sheets included in a hermetic envelope or cover. The packet may be coupled with conventional protection structures formed by panels made of aramid fibers. Another possible alternative is to associate the packet of the present invention at the back of any of the known structures that are resistant to ballistic penetration and/or mechanical impact (such as KEVLAR® or TWARON® sheets or felts).

For the purposes of this invention, the matrix on which the microspheres are scattered does not depend on a particular kind of fibers or microspheres. The known material, the COREMAT® (polyester fibers and hollow polystyrene microspheres) has been specifically mentioned herein and it is considered that other woven or unwoven structures, such as nylon, KEVLAR or TWARON and compounds thereof, are useful for the purpose of this invention and should be considered within the scope thereof.

The microspheres distributed in the matrix are hollow particles preferably with a 1 to 100 micron average diameter. The values of the microsphere diameters are indicated for illustrative purposes only. The microspheres should preferably be hollow particles which are not so small as to behave as a powder material nor so big as to be virtual bores in the matrix. The embedding of microspheres in a resin material is known from U.S. Pat. No. 4,543,106 to Parekti, which is hereby incorporated by reference.

FIG. 1 shows a plurality of orifices or through holes in a COREMAT product that have been produced by a bullet. The fibers are shown in the background of the drawing. A garment may be made in accordance with the present invention by packing layers of KEVLAR, or other suitable fibrous material along with a layer of fiber/microsphere component that have been attached to each other, for example by sewing or VELCRO®, etc., within an envelope that is preferably waterproof.

Ballistic Tests

Comparative tests (i.e., without the antitrauma panel) of ballistic penetration and depth of the trauma were conducted by firing bullets of different caliber on a target formed by a 40 cm×40 cm panel made of monofilament and micro filament KEVLAR or TWARON fibers, compacted in a polyester backstitched covering having sealed edges.

The following Table shows the information corresponding to one of these tests:

TABLE 1

| Surface Penetration of the Bullet into the Panel: in millimeters | | |
| --- | --- | --- |
| Caliber | Without the antitrauma panel | With the antitrauma panel |
| 9 mm | 70 mm | 0 |
| .357 Magnum | 35.0 mm | 3 mm |
| .44 Magnum | 43–44 mm | 6 mm |

The antitrauma panel in accordance with the present invention, used in these tests was formed by 10 layers of 2 mm thick of COREMAT® formed by a non-typical polyester matrix (60% of weight) and hollow microspheres (40% of weight), with a density of 40 $g/m^2$/mm thickness.

Figure 2:
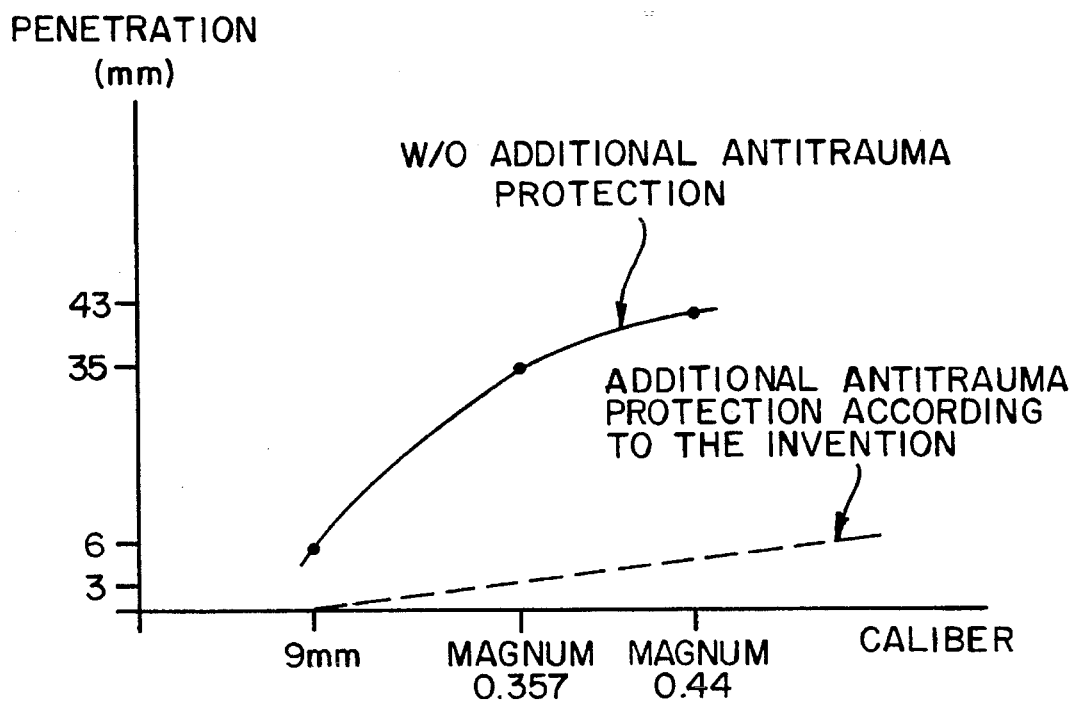
FIG. 2 shows a graph representative of the depth of the trauma in accordance with the data of Table 1.

FIG. 2 shows the antitrauma effect which is verified by supplementing a conventional panel of Kevlar fibers with a package of 12 COREMAT® laminates. The COREMAT® laminates and the Kevlar were included inside an envelope made of oil cloth, i.e. they were loose within a tight envelope thus forming a monolithic structure. The envelope was sewed and the Kevlar and the Coremat laminate were held together inside it. The set of 12 COREMAT® laminates weighs 40 g. These laminates reduce the ballistic deformation of a conventional backing for a .44 Magnum gun from 43 mm to 6.0 mm.

I claim:

1. An antitrauma packet for supplementing the resistance to mechanical impact and to ballistic penetration of structures comprising:
   at least one panel of polymeric fibers, said fibers selected from the group consisting of aramid fibers and polyamids; and
   at least one layer, having a plurality of polymeric fibers with a plurality of hollow microspheres scattered therein and adhesively connected to said plurality of polymeric fibers, being attached to said at least one panel.

2. An antitrauma packet for supplementing the resistance to mechanical impact and ballistic penetration of structures comprising:
   at least one panel of aramid fibers; and
   at least one layer having a plurality of aramid fibers with a plurality of hollow microspheres defined by a polymeric cover scattered therein, and adhesively connected to said plurality of aramid fibers, said at least one layer being attached to said at least one panel.

3. An antitrauma packet according to claim 1, wherein said plurality of polymeric fibers are comprised of fibers selected from the group consisting of polyester, nylon or aramid fibers and mixtures thereof.

4. An antitrauma packet according to claim 2, wherein said plurality of polymeric fibers are comprised of fibers selected from the group consisting of polyester, nylon or aramid fibers and mixtures thereof.

5. An antitrauma packet in accordance with claim 3, wherein said fibers comprise a polymer comprising p-diaminobenzene and terephthalic acid.

6. An antitrauma packet in accordance with claim 4, wherein said fibers comprise a polymer comprising p-diaminobenzene and terephthalic acid.

7. An antitrauma packet in accordance with claim 3, wherein said packet comprises a plurality of laminates, each of said laminates comprises a felt of the group consisting of polyester fibers, aramid fibers or mixtures thereof which form said plurality of polymeric fibers.

8. An antitrauma packet in accordance with claim 4, wherein said packet comprises a plurality of laminates, each of said laminates comprises a felt of the group consisting of polyester fibers, aramid fibers or mixtures thereof which form said plurality of polymeric fibers.

9. An antitrauma packet in accordance with claim 7, wherein each laminate comprises about 40% by weight of microspheres.

10. An antitrauma packet in accordance with claim 9, wherein each laminate comprises about 40% by weight of microspheres.

* * * * *